United States Patent

[11] 3,628,067

[72] Inventors Charles P. Womack
Canoga Park, Calif.;
Charles J. Ulrick, Marion, Iowa

[21] Appl. No. 872,882

[22] Filed Oct. 31, 1969

[45] Patented Dec. 14, 1971

[73] Assignee Collins Radio Company
Cedar Rapids, Iowa

[54] LOW POWER CURRENT PULSER FOR INDUCTIVE LOADS

8 Claims, 4 Drawing Figs.

[52] U.S. Cl. 307/270, 307/235, 330/30 D

[51] Int. Cl. H03k 7/00

[50] Field of Search 330/30 D, 69; 307/52, 80, 81, 86, 87, 235; 323/15

[56] References Cited

UNITED STATES PATENTS

| | | | |
|---|---|---|---|
| 3,173,023 | 3/1965 | Talose | 330/30 |
| 3,305,734 | 2/1967 | Buttonhoff | 330/30 |
| 3,343,073 | 9/1967 | Mesenhimer | 323/15 |

*Primary Examiner*—Donald D. Forrer
*Assistant Examiner*—B. P. Davis
*Attorneys*—Warren H. Kintzinger and Robert J. Crawford

ABSTRACT: A core driving circuit, particularly useful for submicrosecond computer memories, designed for minimum power loss with switching in the output stage from a relatively high-source voltage through the rise times to a much lower source voltage through the flat top portions of regulated output current pulses.

Figures 3, 4:
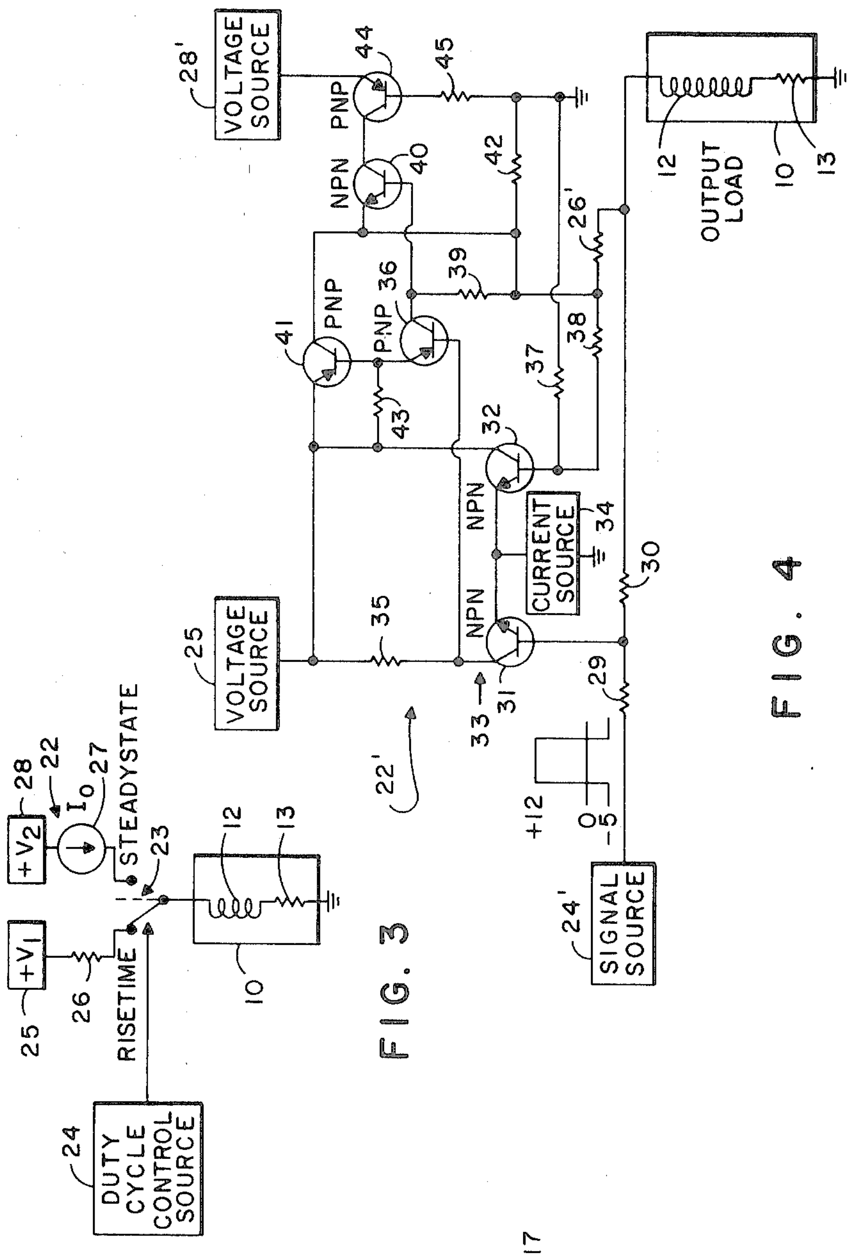

INVENTOR.
CHARLES P. WOMACK
CHARLES J. ULRICK
BY Warren H. Kintzinger
ATTORNEY

LOW POWER CURRENT PULSER FOR INDUCTIVE LOADS

This invention relates in general to core driving circuits, and in particular to a low-power current pulser to inductive load circuit, particularly useful as a core driving circuit.

With a continually advancing state of memory (as related to computers) art, more and more of the associated power functions are being handled by small, low-power integrated circuits. A quite recent generation of 2½D and 3D core memories use integrated circuit sense amplifiers, diode arrays and line selectors, plus a multitude of integrated logic gates, registers and decoders. One circuit in the form of core drivers, generally common to present state of the art core memories, notoriously, by its nature has been resisting the trend to lower power integrated circuits. This has been the case since, in order to provide fast risetime current pulses (in the 300 to 500 ma. range for example) to inductive loads, as required, there must be a relatively high-back voltage capability in the range of approximately 12 to 24 volts provided. These voltage and current requirements are defined by the memory corestack characteristics with the attainment of acceptable operational objectives generally accompanied with the problem of excessive circuit power dissipation. With some preexisting core driver circuits some wasted power with the dissipation problem is occurring in a worst possible place, a. transistor junction with as a result complicated heat sinking required. With many of these known core driver circuits excessive power is also wasted in resistor heating.

It is therefore, a principal object of this invention to provide a pulsed current source circuit capable of quickly driving inductive loads with much less power dissipation than with other inductive load driving circuits having similar risetime characteristics.

Another object with such circuits is to minimize cooling requirements and increase component life.

A further object with such inductive load driver circuits is improved reliability along with improved serviceability.

Features of the invention useful in accomplishing the above objects include in various embodiments, a core inductive load driving circuit using high voltage only during risetime intervals, thereby attaining, advantageously, very short risetimes and then, switching to current fed from a lower voltage source. This achieves operational advantages including power efficiencies much greater than attained with other known driver circuits.

A specific embodiment representing what is presently regarded as the best mode of carrying out the invention is illustrated in the accompanying drawing.

Figure 1:
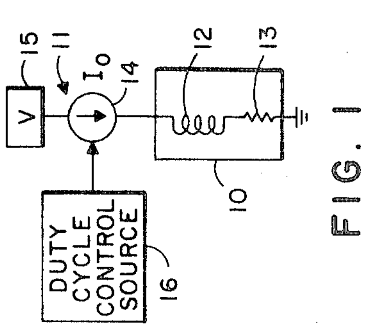
Figure 2:
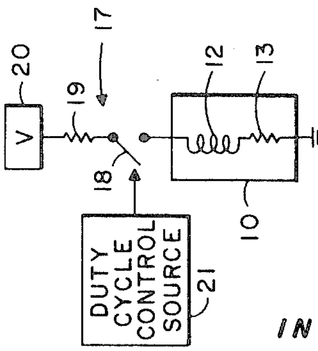

In the drawing:

FIG. 1 represents a simplified block diagram of a pure current source fed by a power supply subject to pulse control in driving an inductive load;

FIG. 2, a simplified block schematic of a series resistor and switch subject to on-off control for pulse drive to an inductive load;

FIG. 3, a greatly simplified block schematic of a hybrid circuit drive with a higher voltage supplied risetime switched to a lower voltage supplied current source drive as pulse drive duty cycle controlled; and, FIG. 4, a more detailed schematic block implementation of an inductive load driving hybrid circuit such as indicated in FIG. 3.

Referring to the drawing:

In the showing of FIG. 1 a typical load 10, driven by the core driver circuit 11, is typical of a bit drive line in a 2½D stack with, as an example, a 1-microhenry coil 12 in series with a 5-ohm resistor 13 connected to ground. The core driving circuit 11, symbolically shown as being a pure current source 14 fed by power voltage supply 15, supplies the current being fed to the load as pulse controlled by duty cycle control source 16. If the core driving circuit 11 is to produce a 400-milliampere current pulse with a 50-nanosecond risetime at an 80-percent duty cycle the voltage supply 15 must be at least a 12-volt power supply. This results in a circuit dissipating approximately 4watts with some 2¾ watts thereof being dissipated in a transistor acting as the pure current source 14 and with the bulk of this wasted power occurring right in a junction of the transistor so used.

The core driving circuit 17, of FIG. 2, in the form of a saturated switch 18 and series resistor 19 connected to a voltage supply 20 is duty cycle controlled by duty cycle control source 21. This circuit approach requires a voltage power supply 20 approximating 20 volts with dissipation of at least 6 watts in the circuit. More than 5 of the 6 watts is dissipated in a series resistor 19 with a transistor as switch 18 being operated in the low-loss saturated mode for this particular implementation. This approach is somewhat easier to handle operationalwise than the circuit of FIG. 1, however, more power is wasted in resistor heating than with the circuit of FIG. 1.

In order to minimize power dissipation applicants have presented a new approach such as generally illustrated by FIG. 3. This hybrid circuit 22 concept utilizes a switch system 23 controlled by a duty cycle control source 24 though successive actuating pulses. Upon actuation from the "off" state, indicated by the dotted switch position, to operational circuit connection with the risetime portion of a load driving pulse, the load current from voltage supply 25 is fed through a relatively low-value resistor 26 and the switch system 23 to the inductive load 10. Then, with the current, rising in a linear manner, upon reaching a desired value level causes the duty cycle control source 24 reactively, in a servolike action, to activate switch system 23 to disconnect from the risetime circuit connection and connect to a current source 27 supplied by a power voltage source 28 of a much lower voltage value than voltage supply 25. Power voltage source 28 is just of such voltage value sufficient to overcome the load drops and still keep the current source 27 out of saturation. To drive a load 10 that inductively acts like a 1-microhenry coil 12 in series with a 5-ohm resistor 13, such as also indicated with FIGS. 1 and 2, voltage supply 25 is a 12-volt supply and power voltage source 28 is a 5-volt supply of like polarity. This presents a circuit capable of operating on approximately 2 watts, advantageously, at only one-half the power requirement of the circuit of FIG. 1 and one-third the power requirement of the circuit of FIG. 2 in driving substantially the same inductive load.

The specific implementation, shown in FIG. 4, of an inductive load driving hybrid circuit 22′, such as generally indicated in FIG. 3, is used for driving an inductive type output load 10, such as typically indicated with a 1-microhenry coil 12 in series with a 5-ohm resistor 13 connected to ground, and, as a circuit requirement, the production of a 400-milliampere current pulse with a 50-nanosecond risetime at an 80-percent duty cycle. In order that this may be accomplished with the hybrid circuit 22′, of FIG. 4, a minus 5-volt to plus 12-volt pulsed waveform is applied as the input thereto from signal source 24′ through resistor 29 and serially on through resistor 30 to the output load 10. The junction of resistors 29 and 30 is connected to the base of NPN-transistor 31 having a common emitter connection with NPN-transistor 32 in a differential amplifier 33. The common emitter junction of the transistors 31 and 32 is connected to current source 34. The collector of transistor 31 is connected through resistor 35 to positive voltage source 25 and this collector is also connected to the base of PNP-transistor 36. The collector of NPN-transistor 32 of the differential amplifier 33 is connected directly to the positive voltage source 25. The base of NPN-transistor 32 is connected both through resistor 37 to ground, and also serially through resistor 38 and sense resistor 26′ to output inductive load 10. The junction of resistor 38 and the sense resistor 26′ is connected through resistor 39 to an interconnecting junction between the collector of PNP-transistor 36 and the base of NPN-transistor 40. The junction of resistors 38 and 26′ is also connected to the interconnecting junction of the emitter of NPN-transistor 40 and the collector of PNP-transistor 41. The resistor 38 and resistor 26′ junction is also connected through resistor 42 to ground. The interconnection between the emitter of PNP-transistor 36 and the base of PNP-transistor 41 is connected through resistor 43 to the positive voltage source 25 to which the emitter of PNP-transistor 41 is directly connected. The NPN-transistor 40 has a common collector connection with PNP-transistor 44 having a base connection through resistor 45 to ground and an emitter connection to positive voltage source 28'. Please note that a diode could be employed in the hybrid circuit in the connection between voltage source 28' and the NPN-transistor 40 anode to the source 28' and cathode to the collector of transistor 40, in place of and to thereby eliminate transistor 44 and resistor 45 from the circuit and still attain much the same hybrid circuit operational results.

With the hybrid circuit of FIG. 4 an easy smooth changeover of short duration is achieved via dual output stage transistors 40 and 41 driving the inductive load from the two voltage sources 25 and 28' with these being, in this specific implementation, a relatively high-voltage source of plus 12 volts and a plus 5 volts voltage source, respectively. Please note that the input pulse signal fed to the circuit in the showing given includes a high voltage of plus 12 volts the same as that of voltage source 25. As a matter of fact, in a working embodiment the same voltage source had been used in supplying one of the voltages to the signal source. The relatively negative and positive voltages could be vastly divergent from those shown with the input signal waveform and still achieve a working system. In actuality, the input signal pulse form could be from an initial positive level to a negative level as a reverse of the waveform shown to such a hybrid circuit with transistors and other voltage sources suitably altered in such a mirror image circuit to provide, in essence, substantially the same operational results in driving such an inductive output load as indicated.

The switchover from the higher voltage source to the lower voltage source is not gradual in that sense but constitutes a dynamically active period of a varied sharing of voltage power contribution to the load from the high-voltage source and the low-voltage source. This extends through a time interval starting as the risetime portion of the pulse signal current delivery to the load is concluded through an initial portion of the level top maximum load current in the load current waveform level portion of the resulting application current to the output load. The lower voltage source 28' takes over ultimately substantially the entire supply of current to the output load throughout the bulk of the level portion of the current waveform supply to the output load. The differential amplifier compares the voltage at the junction of resistors 29 and 30 to the voltage at the junction of resistors of 37 and 38 in a resistor network. This differential amplifier 33, responsive to the voltages developed at these respective junctions of the resistor bridge, as a comparator controls the output stages 40 and 41 of the hybrid circuit 22' to produce a load current such that the offsetting effect of the voltage $V_S$ of the input pulsed waveform is balanced out by the voltage drop across sensing resistor 26', a relatively low-resistance value 1.00 ohm resistor, in the specific implementation. With a high loop gain a transfer function is such as the following: $I_0$ approximately equal to the value of resistor 30 over the value of resistor 29 quantity times $V_S$ over the value of the sensing resistor 26'. This in effect defines the steady state output current.

In actual practice with an implementation such as shown in FIG. 4 the signal voltage $V_S$ from signal source 24' is pulsed from a negative voltage, minus 5 volts in the specific implementation, to a positive operational voltage, plus 12 volts. With $V_S$ a negative voltage the circuit is in standby since it functionally is not capable of developing a sinking current as the transfer function would indicate for a negative $V_S$. When $V_S$ changes to a positive operational voltage, load current starts to increase with the risetime set by the value of inductance in the load circuit, and the positive operational voltage level, plus 12 volts in this specific instance. Immediately upon pulse activation of $V_S$ to the positive 12-volt level the resistor 29–30 and resistor 37–38 and 26' resistive network is initially out of balance and output stage transistor 41 saturates thereby effectively connecting the load to the positive 12-volt voltage source 25 through the sensing resistor 26'. Then, just so long as the output voltage remains above 5 volts, the voltage of voltage source 28' in this specific instance, transistor 40 will not conduct. However, as the load current approaches the final maximum value set by the value of resistor 30 over resistor 29 times voltage $V_S$ over the value of the resistor 26' the resistive network will balance and transistor 41 will come out of saturation thereby allowing the output voltage to fall. As this occurs transistor 40 is voltage bias varied to come on to supply the load current from the 5-volt supply 28'. The circuit components are such that the particular bias resistor values used with resistors 42 and 39 that transistor 41 is almost completely shut off after having provided the risetime portion and a relatively brief but smooth period of initial sharing of the output current with each load driving cycle. It is interesting to note that risetime with the circuit of FIG. 4 is substantially linear since a minimum of series resistance (resistor 26' equal to 1.00 ohm) is used. The final current level is supplied by the low-voltage supply 28' subject to, in essence, servo regulation as the risetime is concluded and throughout the remaining time of maximum current in each cycle of the current pulsed waveform in driving output load 10. Further, the changeover from the high-voltage source load drive to the current source load is accomplished in a dynamic operational action that automatically accomplishes the changeover in a smooth and easy fashion, commencing shortly before the conclusion of the risetime and extending through a relatively brief initial portion of the flaptop of the current output driving pulse to the load 10. It is also interesting to note that the load current final value is set by the $V_S$ positive level and as a result can be readily programmed. A circuit such as shown in FIG. 4 has been produced as a hybrid thin film package with transistors 41 and 40 external thereto with, however, the thin film package containing all the other circuit components including the $V_S$ signal source 24' along with control logic employed.

A low-power current pulser circuit for driving inductive loads exhibiting characteristics such as a 1-$\mu$h. coil in series with a 5-ohm resistor, and as have been outlined herein before, and built in accord with the specific implementation of FIG. 4, uses components and values including the following:

| | |
|---|---|
| Signal Source 24' | –5 to +12 volt input driving pulses |
| Voltage Source 25 | +12 volts |
| Sensing Resistor 26' | 1.00 ohms |
| Voltage Source 28' | +5 volts |
| Resistors 29 and 37 | 10 k.Ω |
| Resistors 30 and 38 | 330 ohms |
| NPN-Transistors 31 and 32 | 2N918 |
| Resistor 35 | 2 k.Ω |
| PNP-Transistor 36 | 2N4209 |
| Resistors 39 and 43 | 100 ohms |
| NPN-transistor 40 | 2N3736 |
| PNP-transistor 41 | 2N3764 |
| Resistor 42 | 220 ohms |
| PNP-Transistor 44 | 2N2907A |
| Resistor 45 | 270 ohms |

Whereas this invention is herein illustrated and described with respect to a specific embodiment hereof, it should be realized that various changes may be made without departing from the essential contributions to the art made by the teachings hereof.

We claim:

1. In an inductive load driving circuit subject to being fed activating voltage pulsed signal inputs: signal input connective means; inductive load connective means; relatively high-voltage source means; relatively low-voltage source means; a first circuit path with opening and closing control means connected to said relatively high-voltage source; a second circuit path with opening and closing control means connected to said relatively low-voltage source; differential DC voltage value sensing means including a current sense resistor, and resistive means in a signal input to output load circuit path from said signal input connective means; and said differential DC voltage value sensing means having control signal connections to the control means of both of said first and second circuit paths and including: resistive network means; and differential voltage value sensing means connected across two junctions of said resistive network means; and wherein said differential DC voltage value sensing means is a differential amplifier.

2. The inductive load driving circuit of claim 1, wherein said differential amplifier includes at least two solid state active devices each having at least three electrodes; with one electrode interconnected with a like electrode between two of said solid state active devices; and with the interconnection between electrodes connected through a maximum flow limit current source to a voltage potential reference source.

3. The inductive load driving circuit of claim 2, wherein said solid state active devices are transistors, and the interconnected electrodes are emitters.

4. The inductive load driving circuit of claim 3, wherein a circuit from the input to the output load connection includes a first resistor and a second resistor; with the base of a first transistor of said differential amplifier connected to the junction of said first and second resistors; a sense resistor; and third and fourth resistors connected in series with the sense resistor from the circuit output inductive load connection through said third and fourth resistors to said voltage potential reference source; power supply circuit means including said first and second circuit paths having a common single connection to the junction of said sense resistor and said third resistor; and with the base of a second transistor of said differential amplifier connected to the junction of said third and fourth resistors.

5. The inductive load driving circuit of claim 4, wherein said sense resistor is a relatively small value resistor; said second and third resistors are substantially equal value of a much greater magnitude than with said sense resistor; and with said first and fourth resistors of substantially equal value and of greater value than said second and third resistors.

6. The inductive load driving circuit of claim 4, wherein the control signal connection to the control means of both said first and second circuit paths is from the collector of said first transistor of the differential amplifier to the base of a first-type transistor having an emitter connection to the base of a transistor of the same first-type with the emitter collector junction thereof in said first circuit path; and with the collector of said first-type transistor connected to the base of a first-type transistor with the emitter collector junction thereof in said second circuit path.

7. The inductive load driving circuit of claim 6, wherein unidirectional current flow means is included in said second circuit path from said relatively low-voltage source.

8. The inductive load driving circuit of claim 7, wherein circuit bias means is provided for the transistors; said first-type transistors are PNP transistors; said second-type transistors are NPN transistors; said voltage sources are positive voltage sources and said unidirectional current flow means is the emitter collector junction through a transistor.

* * * * *